United States Patent [19]

Garrison

[11] Patent Number: 4,995,526

[45] Date of Patent: Feb. 26, 1991

[54] SCRUBBING PAIL HANDLE

[76] Inventor: Warren B. Garrison, 6012 Hampton Ridge Rd., Columbia, S.C. 29209

[21] Appl. No.: 521,735

[22] Filed: May 10, 1990

[51] Int. Cl.⁵ ............................................. B65D 25/00
[52] U.S. Cl. ................................. 220/94 R; 220/90; 15/264
[58] Field of Search ................. 220/94 R, 90; 15/264

[56] References Cited

U.S. PATENT DOCUMENTS

| | | | |
|---|---|---|---|
| 640,701 | 1/1900 | Riddell | 15/264 |
| 1,860,655 | 5/1932 | Chismadia | 15/264 |
| 2,519,666 | 8/1950 | Knox | 15/264 |
| 2,542,737 | 2/1951 | Vogel | 220/90 |
| 2,564,043 | 8/1951 | Ward | 248/113 |
| 2,738,531 | 3/1956 | Gerosa | 15/264 |
| 3,562,841 | 2/1971 | Royalty | 15/264 |
| 3,756,451 | 9/1973 | Popell | 15/264 |
| 4,130,214 | 12/1978 | Sobson | 15/264 X |
| 4,266,746 | 5/1981 | Klaiber | 220/90 X |
| 4,722,113 | 2/1988 | Olsson | 15/264 |
| 4,823,433 | 4/1989 | Curtis | 16/114 |

Primary Examiner—Steven M. Pollard

[57] ABSTRACT

A scrubbing pail having a support attached to the rim of the pail, two brackets attached to the support, a grip pivotally attached between the brackets, and two elongate, curved members spaced apart so as to define a channel therebetween that is narrower than the mop head but wider than the mop shaft and the members extending from the grip, under the support and over a minor portion of the pail opening so that, when the mop is in the pail and is moved into the channel between the two members and lifted by the shaft, the mop head is gripped by the members and the pail is thereby lifted and maintained generally level. The two elongate members can be rotated out of the way if desired.

20 Claims, 2 Drawing Sheets

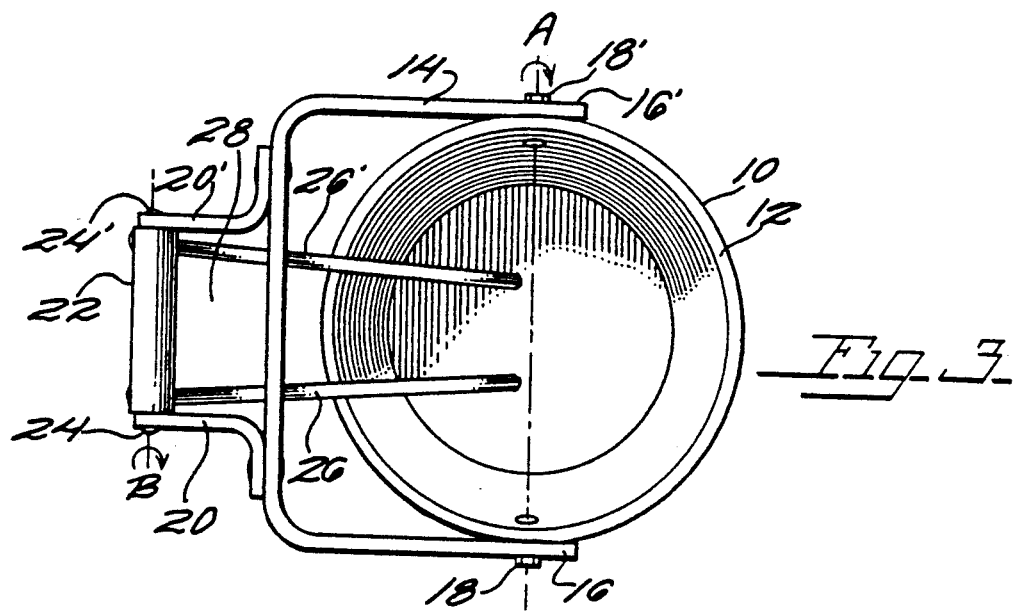
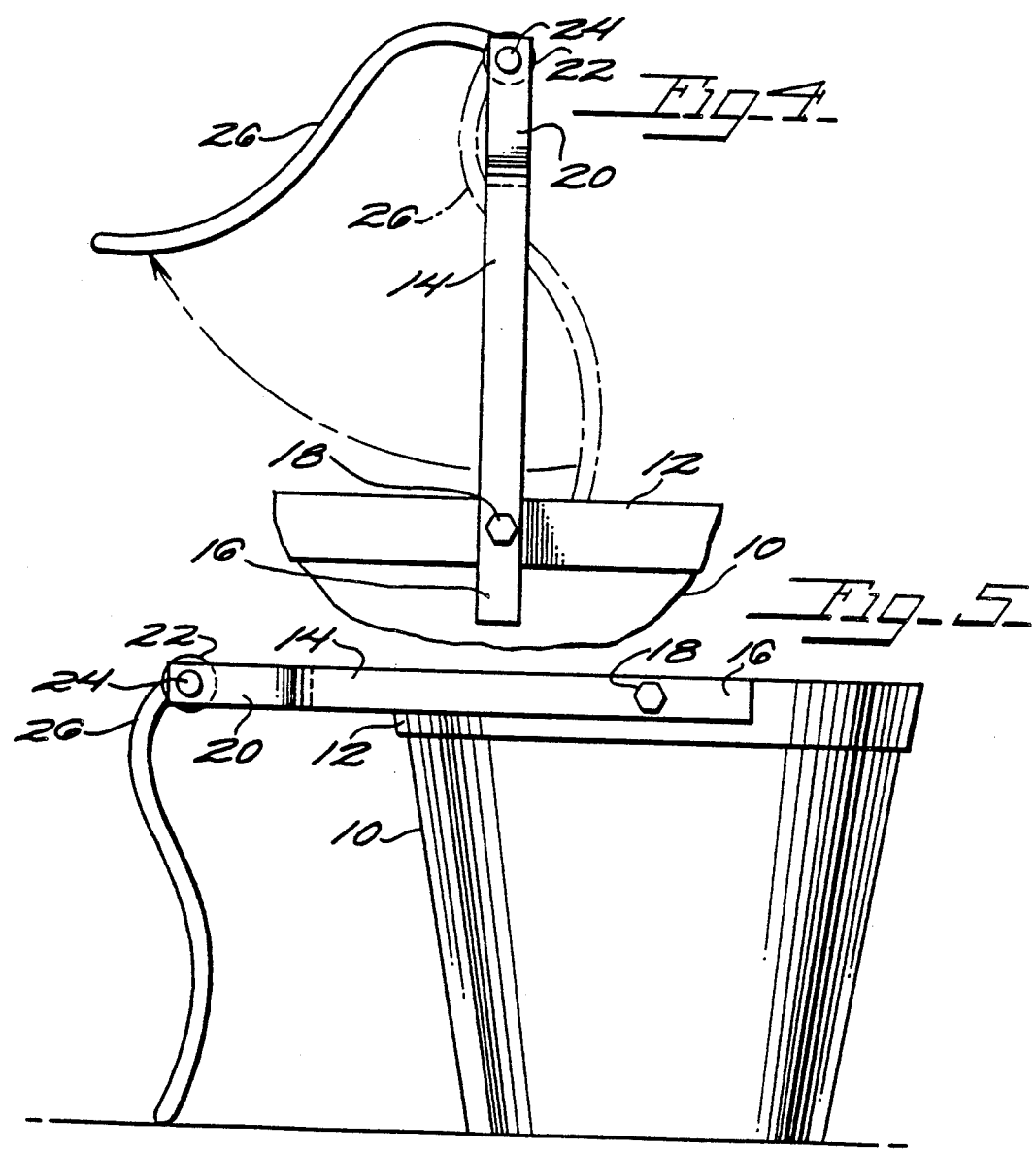

SCRUBBING PAIL HANDLE

BACKGROUND OF THE INVENTION

1. Field of the Invention:

The present invention relates to scrubbing pails used for general cleaning. In particular, the present invention relates to an improved handle system for lifting pails when those pails are used with cleaning tools such as mops, long handled brushes and the like.

2. Discussion of Background:

Mopping a floor, carrying a scrubbing pail and cleaning in general require not only use of the back muscles but asymmetric use of these muscles. Back strain and soreness are dreary rewards for frequent bending to lift, to move, to lower the pail in the performance of cleaning activities such as mopping.

Some industrial pails have castors to permit the rolling of pails from place to place during a mopping activity, but the common variety of scrubbing pail must be lifted and carried from place to place, as has been the practice for many years. This effort requires frequent bending and lifting. There is a need for an ordinary pail that reduces the amount of bending and lifting of scrubbing pails in the process of general cleaning activities.

SUMMARY OF THE INVENTION

According to its major aspects, the present invention is a device that can be attached to a handle of a pail or an improved handle for a pail or an improved pail system for use with a cleaning tool such as a mop or long handled brush having a shaft and a cleaning head to allow the lifting, moving and lowering of the pail without bending over by use of the shaft of the cleaning tool. The device has means for gripping the cleaning tool head when the head is in the pail and means for rotatably attaching the gripping means to the pail so that the gripping means can be rotated out of the way if desired.

The gripping means has at least two elongate, curved members that extend over a minor portion of the opening of the pail spaced apart so that the shaft of the cleaning tool fits into a channel between them but the head of the cleaning tool does not. The curved section of the elongate members holds the cleaning tool radially outward of the centerline of the pail so that the pail remains generally level when the cleaning tool shaft is lifted. The elongate members are held in their spaced relation by a grip rotatably secured to two brackets that are mounted on a support which is attached to the rim of the bucket. The grip serves as a handle for moving the pail when the cleaning tool shaft is not used for this purpose.

The curved elongate members are a feature of the present invention. They rotate under and against the support and over a minor portion of the pail opening. The support stops the rotation of the elongate members and helps to hold them in position over the pail. The curves in the sections of these members cause the cleaning tool head, when slid into the channel between the members, to be maintained in the pail and radially outward of the pail centerline. This feature has the advantage of keeping the pail level when it is lifted.

Another feature of the present invention is the capability to rotate the elongate members out of the way if desired. In addition to making it easier to access the interior of the pail, the members can add stability when the pail is used on an incline such as on a roof.

These and other features and advantages of the present invention will be apparent to those skilled in the art of pails for general cleaning from the following drawings and detailed description of the present invention.

BRIEF DESCRIPTION OF THE DRAWINGS

In the drawings,

FIG. 3 is a top view of the pail system of FIG. 1

FIG. 4 is a detail of a side view according to a preferred embodiment of the present invention showing the handle system of the pail in the vertical position; and FIG. 5 is a side view according to a preferred embodiment of the present invention showing the elongate members rotated out of the way.

DETAILED DESCRIPTION OF A PREFERRED EMBODIMENT

Figure 1:
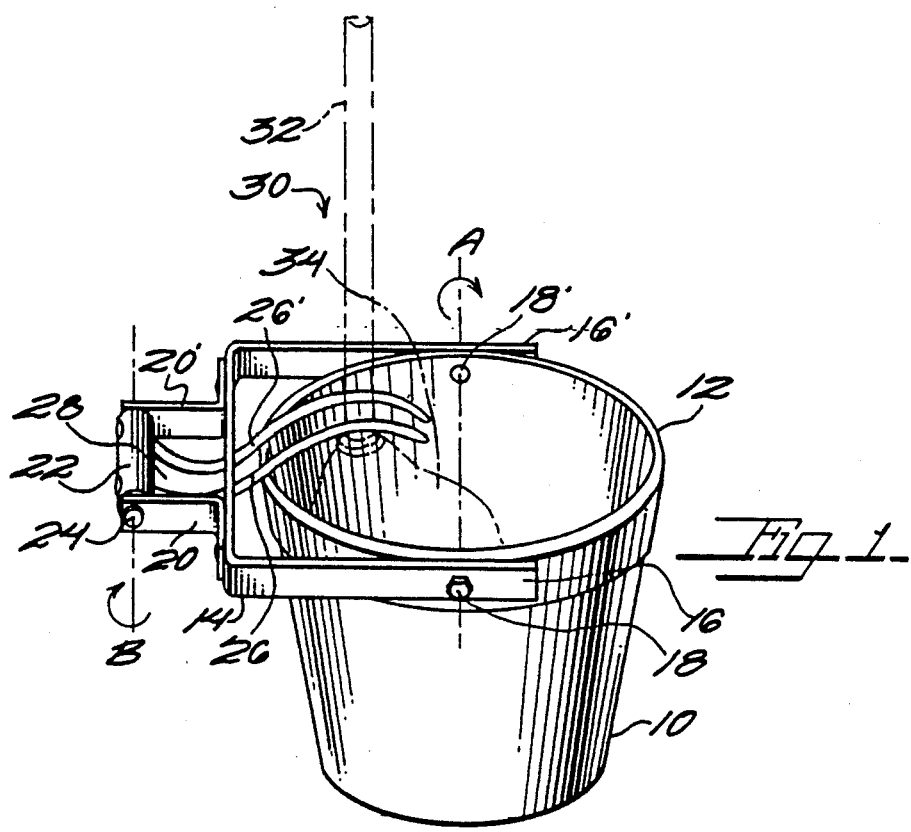
FIG. 1 is a perspective view according to a preferred embodiment of the present invention showing a mop as suggested by the dashed lines.

Referring now to FIG. 1, a pail system according to a preferred embodiment of the present invention has a pail 10 with a reinforced rim 12. To rim 12 is attached a support 14 with two ends, 16, 16' that are attached to rim 12 at diametrically opposing locations on rim 12 with first pivot pins 18, 18', respectively so that support 14 is free to pivot about an axis A through first pins 18, 18'.

Extending from support 14 are two brackets 20 and 20' which hold a grip 22 that serves as handle for lifting pail 10. Grip 22 is attached to brackets 20, 20' by two second pivot pins 24, 24' (see FIG. 3 for second pivot pin 24'). Grip 22 is thus able to pivot freely about an axis B through second pivot pins 24, 24'.

Extending from grip 22 are two elongated members 26 and 26' which are spaced apart so as to form a channel 28 therebetween. A cleaning tool 30 is indicated in FIG. 1 by dashed lines. Tool 30 has a shaft 32 and a cleaning head 34. Typically, cleaning tool 30 is a mop with either a sponge cleaning head or a rag cleaning head or a long handled brush. It is important that cleaning tool have a shaft of small diameter than the diameter of its cleaning head and that the width of channel 28 be intermediate the diameters of shaft 32 and cleaning head 34 so that cleaning tool 30 at shaft 32 can be received into channel 28 and, when lifted, cleaning head 34 does not pass between elongated members 26, 26'. Specifically, the width of channel 28 must be greater than the diameter of shaft 32 and less than the diameter of cleaning head 34. Although cleaning tool 30 cooperates with pail system in the lifting of pail 10, tool 30 is not a part of the present invention.

Figure 2:
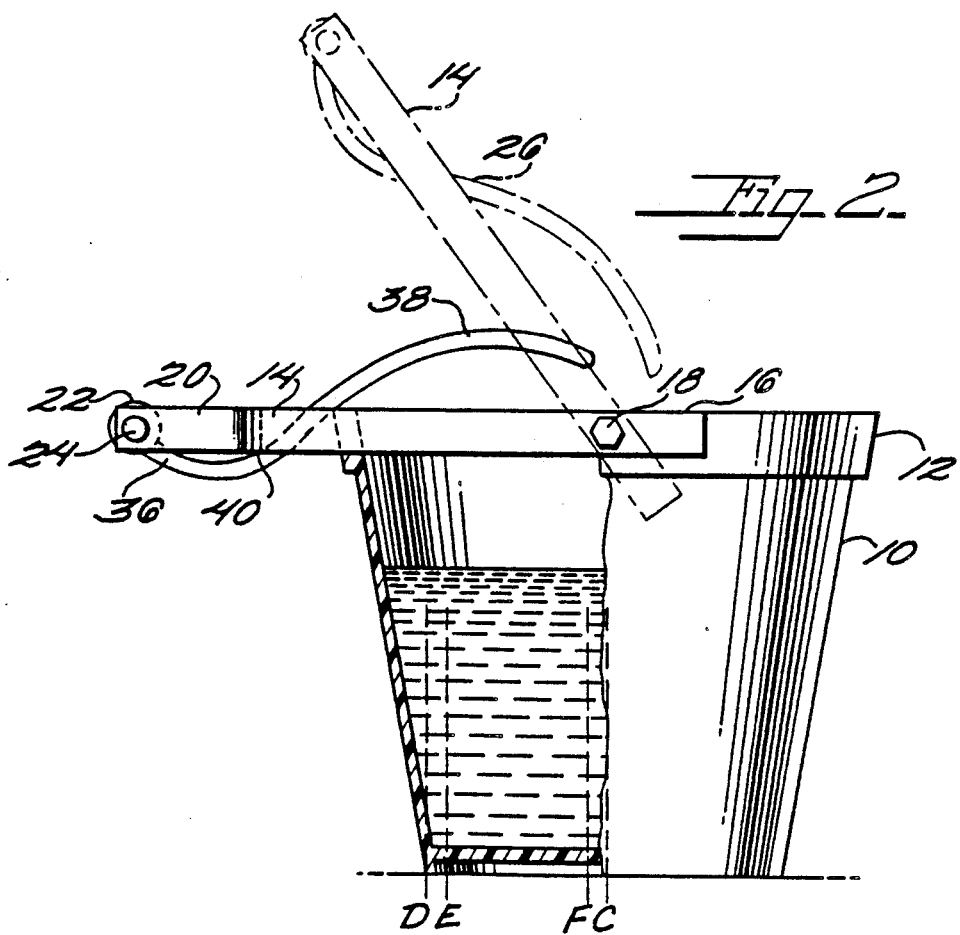
FIG. 2 is a side, partially cut away view of the pail system of FIG. 1.

In FIG. 2, which shows a partially cut away view of pail system with pail 10, with support 14 attached to rim 12 at first pivot pin 18 and with bracket 20 carrying grip 22 pivotally attached with second pivot pin 24, the profile of elongated member 26 can be seen. Elongated member 26 has a first section 36 and a second section 38. First section 36 extends below support 14 at 40. Second section 38 rises over rim 12 and curves over a minor portion of the opening of pail 10. Second section 38 preferably does not extend over the full opening of pail 10, nor even as far as the midpoint of pail 10. Member 26 need only extend over a minor portion as will be described below.

The centerline of the pail is indicated by line C. Without the handle system, the center of gravity of pail 10, with or without cleaning solution therein, will lie along this line, higher with more solution, lower with less.

Point D is the tipping point. If the center of gravity of pail 10 with the handle system would be to the left of Point D in FIG. 2, pail 10 will tip over and spill its contents. Between centerline C and point D are two lines E and F. Line E is the line along which the center of gravity of pail 10 will lie when pail 10 is empty. Line F is the line along which the center of gravity of pail 10 will lie when pail 10 is full. The center of gravity of pail 10 will be between lines E and F depending on how full pail 10 is. Depending on the relative weights of the handle system, pail 10 and the cleaning solution, the exact positions of lines E and F will vary from pail to pail. For example, if pail 10 is made of lightweight plastic and the handle system is mde of metal, line E will be relatively more to the left of centerline C in FIG. 2 than if pail were made of metal also.

Second section 38 curves over the minor portion of the opening of pail 10 between lines E and F so that, when cleaning tool 30 is moved into channel 28 and lifted by its shaft 32, pail 10 is thereby lifted and remains generally level because the curve of second section 38 maintains cleaning head 34 between lines E and F. The shape of second section 38 is important. Second section 38 is preferably upwardly curving to urge cleaning head 34 more toward the center of second section 38 for better balance of a moderately filled pail and to limit rocking. The centermost portion of second section 38 most preferably has a larger radius of curvature since most anywhere in this region will be satisfactory for elongated members 26, 26' to grip cleaning tool head 34, while the outermost portions most preferably have smaller radii of curvature to confine and to urge cleaning tool head toward the centermost portion of second section 38.

It will be evident that lifting the pail by shaft 32 of cleaning tool 30 is possible because the rotation of elongated members 26, 26' about axis B is stopped by support 14 at 40 where elongated members 26, 26' grip cleaning tool head 34 and hold it in pail 10. If cleaning tool head 34 is a mop head wet with cleaning solution, holding the mop head in pail 10 prevents spillage. Importantly, lifting pail 10 by shaft 32 reduces the need for bending, and in the case of a long handled brush, may eliminate it entirely; the back of the lifter can be kept straight and the legs can do the work of lifting.

Pail 10 can also be lifted in a more conventional manner, using grip 22, and rotating support 14 about axis A in the direction indicated by the arrow in FIG. 2. Here again, however, is an advantage of the present invention. The length of bracket 20, 20' reduces the amount of bending necesssary to lift and return pail 10 on the floor. When carried, the distance pail 10 is lifted from the floor depends on the length of the difference between the height of the carrier's hand from the floor and distance of grip 22 to the bottom of pail 10. If the distance from grip 22 to the bottom of pail 10 is increased over that of conventional pails by the length of brackets 20, 20', the amount of bending to lift and return pail 10 on the floor is reduced by the length of brackets 20, 20'. Additionally, pushing down on second section 38 perhaps with cleaning tool head 34 raises grip 22 to meet one's hand in preparation to lift pail 10, to further reduce the amount of bending needed to lift a pail FIG. 3 shows a top view of the pail system and in particular channel 28. Elongated members 26, 26' need to be wide enough where they attach to grip 22 so that a hand fits comfortably around grip 22 between members 26, 26'. However, it is preferably for channel 28 to become narrower when it curves over the minor portion of the opening of pail 10. Most cleaning tool shafts are less than two inches in diameter and a channel width approximately two inches, a little more or a little less, is sufficiently large to receive shaft 32 and sufficiently small so that cleaning tool head 34 will not slip therethrough.

Support 14 moved to the vertical position is shown in FIG. 4, which is a detail of pail system showing a portion of pail 10 and rim 12, first pivot pin 18 attaching end 16 to rim 12, bracket 20 and second pivot pin 24 which allows elongated member 26 to pivot about axis B in the direction shown by the arrow. Elongated member 26, rotated about axis B will clear rim 12 and, when support 14 is lowered as shown in FIG. 5, will have been rotated out of the way when not desired or needed or when additional stability is needed for pail 10, for example, on an inclined surface such as a roof. The elongated member 26 would be conveniently placed down slope to prevent tipping of pail 10. Likewise, elongated member 26 could be rotated out of the way if access to a larger portion of the opening of pail 10 were desired.

It is important in manufacture that the handle system be sufficiently strong, especially elongated members 26, 26' to support the weight of pail 10 filled with cleaning solution. The materials of pail 10 and the handle system will be a factor in determining these strength requirements and dimensions, since a too-heavy, too-long handle system could tip over a too-light, empty pail.

It is possible to construct an attachment to a conventional pail, wherein the arcuate handle of a conventional pail serves as the support and the attachment supplies the brackets, the grip and the elongated members. Alternatively, a handle system with attachment and support to replace completely the arcuate handle of a conventional pail may be provided.

It will be obvious to those skilled in the art from the foregoing that many departures from the specifically described structure of the presently preferred embodiment may be made without departing from the spirit and scope of the invention which is defined by the appended claims.

What is claimed is:

1. A device for use in lifting a pail, said pail having a handle, and for use with a cleaning tool, said cleaning tool having a shaft and a cleaning head attached to said shaft, said cleaning head having a larger diameter than the diameter of said shaft, said device comprising:
   gripping means for gripping said cleaning tool head and holding said cleaning tool head in said pail as said pail is lifted by lifting said shaft of said cleaning tool when said cleaning tool is gripped by said gripping means; and
   means for attaching said gripping means to said pail.

2. The device as recited in claim 1, wherein said attaching means attaches said gripping means to said handle of said pail.

3. The device as recited in claim 1, wherein said gripping means has means for maintaining said pail generally level when lifted by said shaft.

4. The device as recited in claim 1, wherein said gripping means further comprises two members spaced apart so as to define a channel therebetween, said channel having a width intermediate the diameters of said shaft and said cleaning head so that said shaft can pass therethrough but said cleaning head cannot.

5. The device as recited in claim 4, wherein said attaching means can position said two members over a minor portion of the opening of said pail so that said shaft, when in said channel, is radially outward of the centerline of said pail.

6. The device as recited in claim 1, wherein said gripping means is rotatably attached to said attaching means so that said gripping means can be rotated away from said pail and said gripping means further comprises two members spaced apart so as to define a channel therebetween.

7. The device as recited in claim 1, wherein said gripping means is rotatably attached to said attaching means and said gripping means has a first position over a minor portion of the opening of said pail and a second position way from the opening of said pail.

8. The device as recited in claim 1, wherein said gripping means is rotatably attached to said attaching means so that said gripping means can be rotated away from said pail.

9. A handle for use in lifting a pail and for use with a cleaning tool having a shaft and a cleaning tool head, said shaft having a smaller diameter than the diameter of said cleaning head, said handle comprising:
 a first support having two ends, said ends pivotally attached to said pail; and
 gripping means rotatably attached to said first support for gripping said cleaning tool head and holding said cleaning tool head in said pail when said pail is lifted by lifting said cleaning tool by said shaft.

10. The handle as recited in claim 9, wherein said gripping means further comprises two members in spaced apart relation so as to form a channel therebetween, said channel having a width intermediate the diameters of said shaft and said cleaning head.

11. The handle as recited in claim 9, wherein said gripping means further comprises two elongate members in spaced relation so as to define a channel therebetween and the rotation of which is stopped by said first support.

12. The handle as recited in claim 11, wherein said elongate members are spaced apart a width intermediate the diameters of said shaft and said cleaning head.

13. The handle as recited in claim 9, wherein said first support further comprises two brackets and said gripping means further comprises:
 a grip pivotally mounted to said first support by said two brackets;
 two elongate members attached to said grip and spaced apart so as to define a channel therebetween.

14. The handle as recited in claim 13, wherein said elongate members can be rotated to extend over a minor portion of the opening of said pail.

15. The handle as recited in claim 14, wherein said elongate members are spaced apart with intermediate the diameters of said shaft and said cleaning head and are curved so that when said cleaning tool is received therebetween, said shaft of said tool is maintained over said minor portion of said opening of said pail.

16. The handle as recited in claim 9, wherein said gripping means has a means for maintaining said cleaning tool, when said gripping means grips said cleaning head, radially outward of the centerline of said pail so that, when said pail is lifted by said shaft of said cleaning tool, said gripping means grips said cleaning tool, said pail is held generally level.

17. A pail system for use with a cleaning tool having a shaft and a cleaning head, said shaft having a smaller diameter than the diameter of said cleaning head, the pail system comprising:
 a pail having a rim;
 a support having two ends, said ends pivotally attached to said rim of said pail; and
 means for gripping said cleaning tool when said cleaning head is in said pail so that said pail system can be lifted by said shaft of said cleaning tool, said cleaning head remaining in said lifted pail.

18. The pail system as recited in claim 17, wherein said gripping means further comprises:
 a grip;
 bracket means for rotatably attaching said grip to said support;
 two elongate members attached to said grip and spaced apart a width intermediate the diameters of said shaft and said cleaning head.

19. The pail system as recited in claim 18, wherein said two elongate members can be rotated over a minor portion of the opening of said pail and be stopped against said support from further rotation.

20. The pail system as recited in claim 19, wherein said elongate members each has means for maintaining said cleaning tool in said minor portion of the opening of said pail.

* * * * *